Sept. 22, 1936.  E. H. EASTMAN  2,054,877
POWER TRANSMISSION SYSTEM FOR MOTOR VEHICLES
Filed July 23, 1935  2 Sheets-Sheet 1
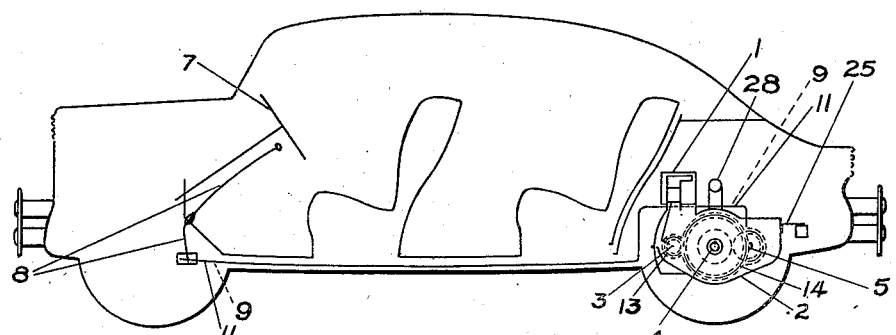
Fig. 1
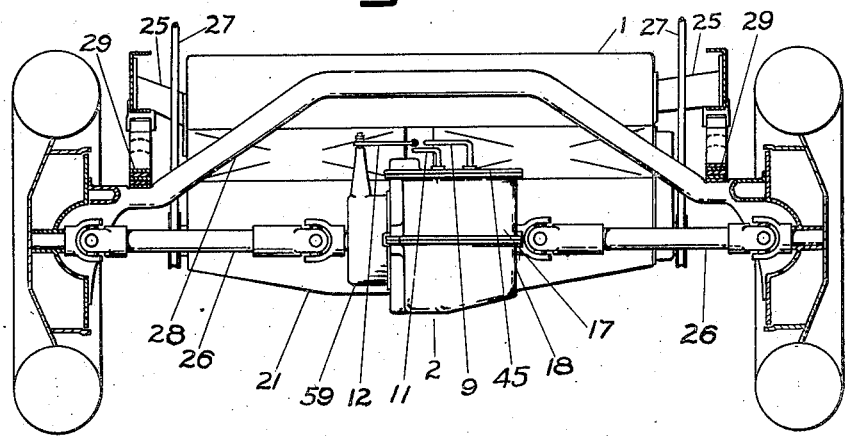
Fig. 2
Fig. 3.
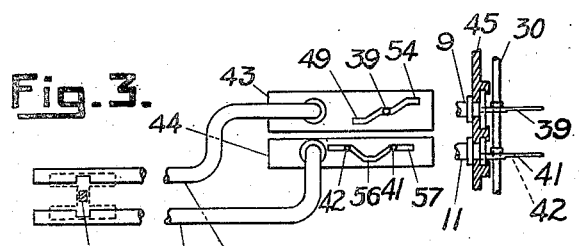
Fig. 3A
Fig. 4.
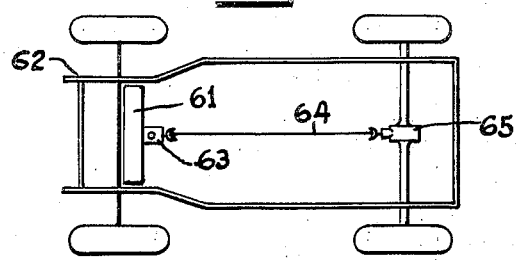
INVENTOR
Edward H. Eastman Sept. 22, 1936.   E. H. EASTMAN   2,054,877
POWER TRANSMISSION SYSTEM FOR MOTOR VEHICLES
Filed July 23, 1935   2 Sheets-Sheet 2

INVENTOR
Edward H. Eastman

Patented Sept. 22, 1936

2,054,877

UNITED STATES PATENT OFFICE 2,054,877

POWER TRANSMISSION SYSTEM FOR MOTOR VEHICLES

Edward H. Eastman, Los Angeles, Calif.

Application July 23, 1935, Serial No. 32,703

7 Claims. (Cl. 180—70)

The present invention relates to motor vehicles and more particularly to that type of motor vehicle in which the motor is mounted transversely with respect to the major or longitudinal axis of the vehicle.

Primarily, the invention is concerned with the arrangement of transmission elements and with the means of power transmission from the motor to the driven wheels and includes the novel feature which permits the power to be taken from a point near the middle of the crankshaft of the motor for transmission to the wheels.

The transmission consists of a clutch, a change speed mechanism, and a differential mechanism or equivalent mechanisms, all of which are compactly arranged on or near the side of the motor near its middle. By locating the transmission in this manner, it is possible to concentrate the entire power plant, thus permitting the use of a long, in-line type of motor in such restricted space as is available for transverse mounting.

When the invention as outlined above is applied to a rear motor type of vehicle, the motor and transmission are mounted to the frame of the vehicle behind the rear seat and transmit power to the wheels by means of two flexible connections. The mechanical efficiency of the drive is identically equivalent to that of the conventional system of power transmission now in use in motor vehicles, having one gear reduction, two universal joints, and a differential mechanism interposed between motor crankshaft and driven wheel.

When the invention is embodied in a front wheel drive vehicle, the motor and transmission are mounted to the frame substantially the same, with respect to the driven wheels, as in the rear motor type of vehicle. In the front wheel drive less transverse space is available for mounting due to the frame members being brought closer together to allow the wheels room for steering; however, by the use of the present invention, a six cylinder motor, or a V-type motor may be so mounted. The motor and transmission, when mounted as above described, occupy only approximately one-third of the longitudinal space used in the existing type of mounting for a front wheel drive wherein the motor, transmission, gear reduction, and differential are all placed in line, and the unit mounted longitudinally in the vehicle.

The invention which relates in a major degree to the method of driving from the vicinity of the middle of the crankshaft of a transversely mounted motor and through a transmission in close proximity, may also be applied to such a type of drive as that in which the motor is mounted transversely at either the front or rear of the vehicle, and drives the wheels at the opposite end of the vehicle by suitable flexible connection and axle.

One object of the invention is to provide a driving arrangement which is economical of the space occupied by the motivating elements and which allows the passengers or load to occupy more of the available space between the front and rear axles. This permits the load to be placed nearer to the center of the wheel base where the greatest riding comfort is attained.

Another object of the invention is to reduce the unsprung weight of the vehicle so that the driven wheels maintain a closer, more even contact with the road and impart less of a shock to the body of the vehicle when reacting to impact such as that produced by a rough road.

A further object of the invention is to reduce the whip or torsional vibration in the motor crankshaft by shortening the length of the crankshaft operating to the point of drive.

A further object of the invention is to reduce the overall length of the motor and transmission by locating the transmission off the side of the motor instead of at the end, thus permitting the use of a long, in-line type of motor in the restricted space available for transverse mounting.

Other objects and features of advantage will appear hereinafter, and while only the preferred forms of construction are described and illustrated, it is to be understood that the invention is not limited to such preferred forms, but that various changes and adaptations may be made therein without departing from the spirit of the invention as hereinafter claimed.

The invention will be understood from the following description when read in connection with the accompanying drawings.

In the drawings:

Figure 1 is a diagrammatic side elevation of a motor vehicle showing the arrangement of elements in a rear motor type of vehicle to which the invention has been applied.

Figure 2 is a rear elevation of the vehicle shown in Figure 1, partly in section, showing the manner in which the motor and the transmission is mounted and the flexible connection to the driven wheels.

Figures 3 and 3A are top and sectional views, respectively, of the mechanism used in shifting the two dogs and the slide gear of the transmission shown in Figure 5.

Figure 4 is a diagrammatic top elevation of the invention as applied to that type of vehicle in which the motor is mounted transversely at the front and drives the wheels at the rear.

Figure 6:
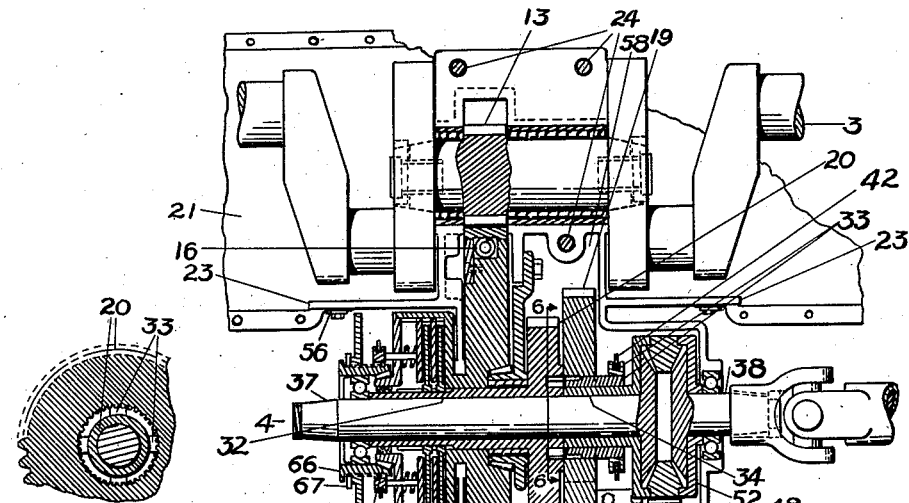
Figure 6 is a section through the high speed shift dog and the complementary notches into which it slides, taken on the line 6—6 of Figure 5.

Referring to Figure 1 of the drawings, it will be noted that the motor 1, which is transversely mounted behind the rear seat of the vehicle shown, has attached to its longitudinal side which faces the rear end of the vehicle, a casing 2 in which all of the transmission mechanisms are enclosed. The crankshaft 3 of the motor 1, the primary transmission spindle 4, and the secondary spindle 5, are all arranged parallel with each other and in the same horizontal plane. Thus, a very compact assembly of motivating parts is provided which can easily be installed in the limited space available in the front or rear part of the vehicle.

The steering mechanism 7 comprises the standard equipment, while the change speed mechanism is arranged slightly different from the usual mechanism due to the distance between the gear shift lever 8 and the transmission to the rear of the motor 1, as will be described hereinafter.

The change speed mechanism includes the gear shift lever 8 (Figures 1 and 3) and suitable rods 9 and 11 establish the connection between the shifting lever 8 and the change speed mechanism enclosed in the transmission casing 2 in back of the transversely mounted motor 1. The clutch is operated by a lever 12 (Figure 2) which in turn is connected to a conventional clutch pedal (not shown) in the driver's compartment.

As has already been mentioned at the beginning of the specification, the drive from the motor to the transmission is accomplished in the present invention in a novel manner, and it will presently be described how this is done.

Rigidly attached to the crankshaft 3, which is made in three separate parts rigidly secured to each other and at a point as near as possible to its center, is a pinion 13 (Figures 1, 5 and 7) which is held in mesh for driving relationship with a much larger gear 14 by means of which the drive is transmitted from the motor 1 into the transmission. The gears 13 and 14 being of a different size provide the desired speed reduction between the driving and the driven parts of the vehicle. The gear 14 is yieldably mounted on a disc 15 (Figures 5 and 7) by means of springs 16. This is done to eliminate some of the unevenness of impulse which might otherwise be imparted to the main transmission spindle 4 by the motor in case of misfiring.

Figure 5:
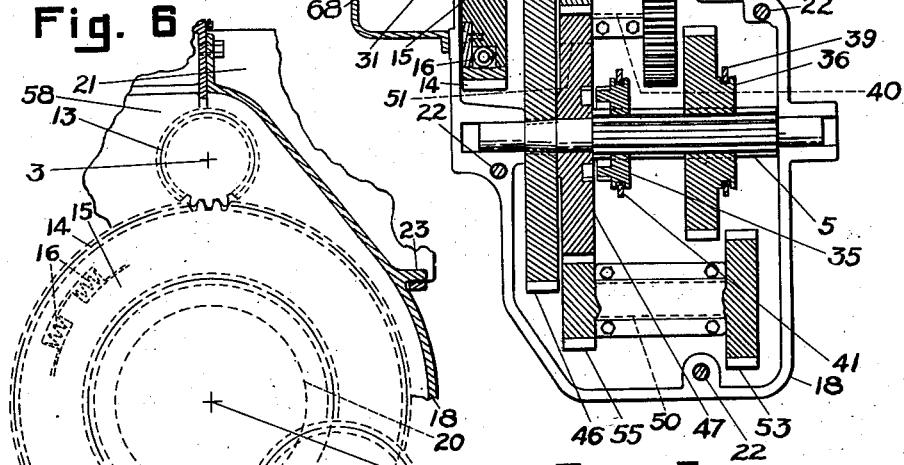
Figure 5 is a sectional view of the transmission mechanism and the central part of the motor crankshaft to illustrate the manner in which the drive is taken from the crankshaft.
Figure 7:
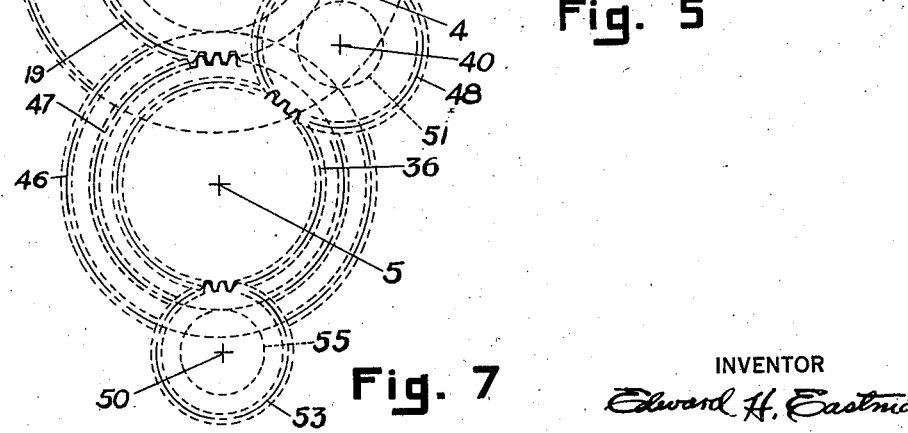
Figure 7 is a diagrammatic side elevation of the change speed gears employed in the transmission shown in Figure 5, and a portion of the housing in section.

The casing 2 in which the entire transmission is enclosed, comprises an upper portion 17, a lower portion 18, and a cover 59 for the clutch (Figure 2). The upper portion 17 of the transmission case 2 (Figure 2) is cast with the block of the motor, and walls extend into the block to surround the cavity which provides room for the pinion gear 13 and the gears 14, 20, and 19 (Figures 5 and 7). These walls seal the transmission lubricant in and prevent it from being carried into the crankcase 21 of the motor. The lower portion of the transmission case 18 is attached to the top portion 17 by long screws 22 (Figure 5) and serves as a mounting for the bearings in which the various transmission shafts run. A flange 23 (Figures 5 and 7), extends around the lower transmission case 18, and the crankcase 21 of the motor is attached tightly to this flange and to the block of the motor.

The lower portion 18 of the transmission case extends into the crankcase to enclose the transmission gears and is fastened by means of three screws 24 to the center bearing of the crankshaft. The entire assembly of motor and transmission is attached to the frame of the motor vehicle at three points designated by 25 in Figures 1 and 2.

Flexible drive connections 26 (Figure 2) carry the power from the two ends of the transmission to the wheels. For cooling the motor, two fan belts 27 which drive fans in order to establish proper air circulation, are driven by pulleys at each end of the motor. The fans draw air through twin radiators placed in the sides of the body behind the rear seat. The fan belts are shown for the purpose of indicating how the placement of the transmission near the middle of the crankshaft makes both ends of the crankshaft available for this purpose. A light tubular axle 28, (Figure 2) holds the wheel bearings in alignment and serves to support the springs 29.

As stated above, the gear 14 (Figures 1, 5, and 7) comprises the means for effecting a proper speed reduction between the motor and the driven elements and this gear is mounted upon a disc 15 which constitutes the core of said gear 14 and the shell of the dry disc clutch 31. When gear 14 is driven and the plates of the clutch are engaged with one another, the inner plates being splined to the sleeve 32, drive the latter and therewith the gear 20 which forms an integral part thereof. When the plates of the clutch are disengaged, sleeve 32 and gear 20 remain stationary. Shift dog 33 on sleeve 34 and shift dog 35 and slide gear 36 on splined shaft 5 are used in shifting to obtain the various speeds of the internal shafts 37 and 38 with respect to the gear 20. The dogs and slide gear are moved transversely to obtain engagement or disengagement by means of yokes 39, 41, and 42 (Figures 3A and 5). These yokes slide transversely on two shafts, one of which is shown at 30, and move the slide gear 36 or dogs 33 and 35 by engagement in a complementary groove on said slide gear or dog. Slides 43 and 44 operating in grooves in the transmission cover 45, when moved, actuate the yokes 39, 41, and 42 transversely through means of slots in the slides which bear against pins fixed in the tops of the yokes. The manner in which the operating parts within the transmission function upon shifting of the lever 8 will presently be described.

Consider the gear shift lever 8 in the driver's compartment to be employed in the manner used for "standard shift".

*Neutral.*—With the gear shift lever 8 in "neutral" position, the shift dogs 33 and 35, and slide gear 36, are held disengaged by shift forks 42, 41, and 39, respectively, pictured in Figures 3, 3A, and 5, while the gear 20 drives spiral gear 46 which is solidly keyed to spline shaft 5. Inasmuch as the dog 35 is not engaged with gear 47, the smooth portion of spline shaft 5 rotates in gear 47 without driving it and the shift dog 33 also being in the disengaged position, permits gear 20 to rotate without turning the gear 19.

*Reverse.*—If the gear shift lever 8 is held in "reverse" location, the shift dogs 33 and 35 remain disengaged from their associated gears while the slide gear 36 is shifted into engagement with the gear 48. This is accomplished by shifting rod 9 (Figure 3) which is attached to the slide 43 a sufficient distance so that the pin in the top of shifting yoke 39 is moved to a lateral position 49 by the slot in slide 43. Yoke 39 is engaged in a complementary groove on the side of gear 36. Power will now be transmitted as follows: the gear 20 will drive gear 46 which is attached to the spline shaft 5. The slide gear 36, driven by the splines on shaft 5, will drive gear 48 which is keyed to the same shaft as the gear 51 (Figure 7). The latter in turn will drive in a reverse direction the gear 19 which is connected by a sleeve 34 to the shell of differential 52 while the two transmission shafts 37 and 38 are driven through means of the differential and in turn drive the flexible connections 26 to the wheels.

*Low speed.*—With the gear shift lever 8 moved to a position of "low speed", the shift dogs 33 and 35 are held disengaged and slide gear 36 is shifted to engage the gear 53. This is accomplished by moving rod 9 in a manner as above described, so that the pin in the top of shifting yoke 39 is moved to a lateral position 54 by the slot in slide 43. Power is now transmitted as follows: the gear 20 drives gear 46 which is attached to spline shaft 5. Slide gear 36, driven by the splines on shaft 5, drives gear 53 which is keyed to the same shaft as gear 55; the latter drives gear 47 which in turn rotates freely about the smooth portion of spline shaft 5 to drive gear 19 in a forward direction at low speed. The drive from gear 19 to the wheels is the same as heretofore described.

*Intermediate speed.*—If the shift lever 8 is moved to "intermediate speed" position, shift dog 33 and slide gear 36 will be held disengaged and shift dog 35 is shifted along the splines of shaft 5 so that it engages complementary notches in the gear 47. This is accomplished by moving rod 11 (Figure 3) in the same manner as heretofore described so that the pin in the top of shifting yoke 41 which actuates dog 35 is moved to a lateral position 56, while the pin in the top of yoke 42 controlling the lateral movement of dog 33, slides in the straight end of the slot in the slide and does not move laterally and hence is held disengaged. Power is now transmitted as follows: gear 20 will drive gear 46 which is keyed to spline shaft 5 while the dog 35, driven by the splines of shaft 5, will drive the gear 47, which in turn will impart movement to the gear 19 in a forward direction at somewhat diminished speed in relation to gear 20. The driving relationship from gear 19 to the wheels will be the same as heretofore described.

*High speed.*—With the shift lever 8 adjusted to the "high speed" position, shift dog 35 and slide gear 36 are held disengaged and the four prongs of the shift dog 33 are shifted through the close fitting holes in gear 19 until the notches on the outer surfaces of the four prongs engage in the notches in the outer wall of the recess in gear 20, as shown in Figures 5 and 6.

At this point, it may be well to explain that due to the fact that the gear 19, the sleeve 34, and the near side of the differential shell are all made in one piece, dog 33 must be constructed from several parts in order to enable it to be assembled into position. To engage dog 33 while holding dog 35 in a disengaged position, rod 11 is moved as above mentioned in a direction opposite to that used in shifting for intermediate speed; thus the pin which moves the shifting yoke 42 for dog 33 is moved to a lateral position 56, while yoke 41 is held at 57. Power is now transmitted as follows: gear 20 will drive dog 33 due to its engagement with the notches on the outer surface of the four prongs of the dog 33 (Figures 5 and 6). The four prongs of the dog 33, being closely in contact with the walls of the holes in gear 19 through which they have been shifted, will now drive gear 19 at the same speed as gear 20, the drive from gear 19 to the wheels being the same as has been previously described.

The construction as outlined above and as illustrated in the accompanying drawings, is the preferred form of the invention. It is, of course, possible to deviate from this construction slightly without in any way departing from the scope of the invention as covered by the claims hereinafter.

For instance, the transmission mechanism which is enclosed in the casing 2 and shown attached to the rear of the motor 1 (Figure 1) can, of course, be secured to either longitudinal side of the motor, depending on whether the same is mounted in the front or the rear of the vehicle. It will also be noted, when viewing Figures 5 and 7 that the gear compartment 58 is sealed off from the crankcase 21 so that two types of lubricants may be used in the two separate compartments.

The housing 69 for the clutch (as shown in Figures 2 and 5), constitutes a dust shield for the clutch, and at the same time supports the two outer bearings at the clutch end. It is desirable to provide an adjusting means for the outer race of the tapered roller bearing 68. This is done by means of threaded sleeve 66 (Figure 5) which contains the outer race, and lock nut 67 which locks the sleeve 66 in its adjusted position.

When, as illustrated in Figure 4, a transversely mounted motor 61, mounted to the frame 62, is used to drive the wheels at the rear of the vehicle, a conventional change speed mechanism 63 which is arranged in the close proximity of the middle of the crankshaft may be actuated by means of a worm or bevel gear, or any other suitable means from the central portion of the crankshaft, and may connect to the rear wheels by a flexible connection such as the conventional drive shaft 64 and rear axle 65.

I claim:

1. In a motor vehicle, a frame, a motor and a transmission mounted transversely at one end of said frame, said motor and transmission being integrally secured to each other and suspended at three points from said frame substantially below the top plane thereof, a drive pinion attached centrally on the crankshaft of said motor and driven thereby, said drive pinion communicating with reduction gearing within said transmission to drive a clutch, change speed and differential mechanism all enclosed within said transmission to reduce the unsprung weight of said vehicle, flexible connections to the driven wheels from opposite ends of said transmission, and an axle holding said driven wheels in alignment, said axle extending across the top of said transmission and independent thereof.

2. In a motor vehicle, a transverse motor, a power transmission device attached to a longitudinal side of said motor, a crankshaft driven by said motor, a drive pinion centrally fixed thereon and in communication with a speed reducing gear within said transmission, said transmission containing a clutch, change speed gearing, differential gearing and slotted cam plates slidably mounted therein and manually and selectively shiftable to effect adjustment of said change speed mechanism upon disengagement of said clutch.

3. In a motor vehicle, a transversely mounted motor and transmission, a crankshaft driven by said motor, a drive pinion centrally affixed to said crankshaft and held in driving relationship with reduction gearing within said transmission, all elements of said transmission being enclosed in an upper and lower housing, said upper housing being integrally formed with the motor block, said lower housing being attached to said upper housing and to the crankcase of said motor and extending into said crankcase, being secured therein to the center bearing of said motor crankshaft to form a separate enclosure surrounding said drive pinion and said transmission elements.

4. In a motor vehicle, a frame, a transversely mounted motor and transmission at one end of said frame, being suspended therefrom at three points substantially below the top plane of said frame, a crankshaft driven by said motor, said crankshaft comprising three sections rigidly joined, a drive pinion affixed to the center section of said crankshaft and held in driving relationship with reduction gearing within said transmission, all power transmission elements including a clutch, change speed and differential gearing being enclosed in an upper and lower housing, said upper housing being integrally formed with the motor block, said lower housing being attached to said upper housing and to the crankcase and extending into said crankcase, being secured therein to the center bearing of said motor crankshaft to form a separate enclosure surrounding said drive pinion and said transmission elements.

5. In a motor vehicle, a frame, a transversely mounted motor and transmission at one end of said frame, being suspended therefrom at three points and held substantially below the top plane of said frame, said transmission integrally secured to said motor, and comprising reduction gearing driven by a pinion centrally located on the crankshaft of said motor, a clutch, change speed gearing, and differential gearing, flexible drive connections projecting from opposite ends of said transmission to the driven wheels of said vehicle, and an axle member adapted to straddle said transmission without contacting the same, being mounted to the springs at points substantially above the wheel centers and in close proximity to the horizontal plane through the center of gravity of said motor vehicle.

6. In a motor vehicle, a transverse motor, a power transmission device attached to a longitudinal side of said motor, a crankshaft driven by said motor, carrying a drive pinion centrally fixed thereon in communication with a speed reducing gear within said transmission, a clutch, change speed gearing and differential mechanism contained within said transmission, slotted cam plates slidably mounted therein, and manually and selectively positioned by shift rods secured thereto, and shift yokes held in engagement with said slotted cam plates to effect adjustment of said change speed mechanism upon disengagement of said clutch.

7. In a motor vehicle, a transversely mounted motor and transmission, a crankshaft driven by said motor, a drive pinion centrally fixed to said crankshaft, and in communication with a speed reducing gear within said transmission, a clutch comprising a housing integral with said speed reducing gear and driven therewith, said speed reducing gear being mounted rotatably about a sleeve, friction discs secured thereto cooperating with discs secured within said clutch housing, manual clutch engaging or disengaging means, a high speed transmission gear integrally formed on said sleeve, a second sleeve juxtapositioned to said first sleeve, an idler gear and a planetary gear carrying housing rigidly secured to said second sleeve, a slidable dog splined to said idler gear, manually engageable with said high speed transmission gear, both of said sleeves being supported rotatably on a primary transmission shaft, the latter comprising two separate parts in axial alignment and provided at their adjacent ends with sun gears held in driving relationship with said planetary gear carrying housing, the opposite ends of said primary transmission shaft being extended outwardly of said transmission, and connected through flexible drive connection with the driven wheels of said vehicle, a secondary and splined transmission shaft, having rigidly secured thereto a reduction gear driven by said high speed transmission gear, an intermediate speed gear freely rotatable about said secondary transmission shaft, a slidable dog and a slidable gear splined to said secondary transmission shaft, said dog being manually engageable with said intermediate speed transmission gear, said slidable idler gear being manually and selectively engageable with a low speed transmission gear or a reverse speed transmission gear, said intermediate, low and reverse speed gears held in constant driving relationship with the idler gear on said primary transmission shaft.

EDWARD H. EASTMAN.